United States Patent
Reister et al.

(10) Patent No.: US 6,188,964 B1
(45) Date of Patent: Feb. 13, 2001

(54) METHOD FOR USING GLOBAL OPTIMIZATION TO THE ESTIMATION OF SURFACE-CONSISTENT RESIDUAL STATICS

(75) Inventors: David B. Reister, Knoxville; Jacob Barhen, Oak Ridge; Edward M. Oblow, Knoxville, all of TN (US)

(73) Assignee: UT-Battelle, LLC, Oak Ridge, TN (US)

( * ) Notice: Under 35 U.S.C. 154(b), the term of this patent shall be extended for 0 days.

(21) Appl. No.: 09/395,536

(22) Filed: Sep. 14, 1999

(51) Int. Cl.$^7$ ............................................ G01V 1/28
(52) U.S. Cl. ........................................................ 702/17
(58) Field of Search ................................. 702/14, 16, 17, 702/18; 367/73

(56) References Cited

U.S. PATENT DOCUMENTS 5,508,914   4/1996   Lee ........................................ 364/421

OTHER PUBLICATIONS

Barhen et al., "Generalized TRUST algorithms for global optimizations," in State of the Art Global Optimization: Computational Methods and Application, Floudas, C.A. and Pardolas, C.A. Pardolas, P.M., Eds., Kluwer Academic Press, Dortrecht, Netherlands, pp. 163–183 (1996).

Barhen et al., "TRUST: A deterministic algorithm for global optimization," *Science*, 276, pp. 1094–1097 (1997).

Cetin et al., "Terminal repeller unconstrained subenergy tunneling (TRUST) for fast global optimization," Journal of Optimization Theory and Applications, 77, pp. 97–126 (1993).

DuBose, "Practical steps toward realizing the potential of Monte Carlo automatic statics," Geophysics, 58, pp. 399–407 (1993).

Marsden, "Static corrections—a review," The Leading Edge, 12, Part 1, pp. 43–49, Part 2, pp. 115–120, Part 3, pp. 210–216 (1998).

Ronen et al., "Surface–consistent residual statics estimation by stack–power maximization," Geophyics, 50, pp. 2759–2767 (1985).

Rothman, "Nonlinear inversion, statistical mechanics, and residual statics corrections, " Geophysics, 50 pp. 2784–2796 (1985).

Rothman, "Automatic estimation of large residual statics corrections,"Geophysics, 51 pp. 332–346 (1986).

Sheriff, et al., Exploration seismology, Second Edition, pp. 303–305, Cambridge University Press, Cambridge, England (1995).

Taner et al., "Estimation and correction of near–surface time anomalies," Geophysics, 39 pp. 441–463 (1974).

Wiggins et al., "Residual statics analysis as general linear inverse problem," Geophysics, 41 pp. 922–938 (1976).

Yilmaz, Seismic Date Processing, Society of Exploration Geophysics, Tulsa, Oklahoma (1987), pp. 196–203.

*Primary Examiner*—Donald E. McElheny, Jr.
(74) *Attorney, Agent, or Firm*—Needle & Rosenberg, P.C.

(57) ABSTRACT

An efficient method for generating residual statics corrections to compensate for surface-consistent static time shifts in stacked seismic traces. The method includes a step of framing the residual static corrections as a global optimization problem in a parameter space. The method also includes decoupling the global optimization problem involving all seismic traces into several one-dimensional problems. The method further utilizes a Stochastic Pijavskij Tunneling search to eliminate regions in the parameter space where a global minimum is unlikely to exist so that the global minimum may be quickly discovered. The method finds the residual statics corrections by maximizing the total stack power. The stack power is a measure of seismic energy transferred from energy sources to receivers.

29 Claims, 11 Drawing Sheets

METHOD FOR USING GLOBAL OPTIMIZATION TO THE ESTIMATION OF SURFACE-CONSISTENT RESIDUAL STATICS

STATEMENT REGARDING FEDERALLY SPONSORED RESEARCH OR DEVELOPMENT

This invention was made with Government support under Contract No. DE-AC05-96OR22464 awarded by the U.S. Department of Energy to Lockheed Martin Energy Research Corp., and the Government has certain rights in this invention.

BACKGROUND OF THE INVENTION

1. Field of the Invention

The present invention comprises methods for generating surface-consistent residual statics. In particular, the invention relates to methods for calculating static corrections for seismic data by minimizing an objective function using global optimization thereby to maximize a corresponding stack power. The stack power is decoupled from the overlapping between different seismic traces into several one-dimensional problems. The surface-consistent residual statics that minimize the objective function are determined by using a Stochastic Pijavskij Tunneling technique to eliminate regions where the global minimum of the objective function is unlikely to exist so that the global minimum of the objective function can be reached without determining the objective function in these eliminated regions.

2. Background Art

The Problem

Seismic exploration is a predominant geophysical activity conducted to find commercial accumulations of oil, gas, or other minerals, to study the nature of the Earth for the foundations of roads, buildings, dams, tunnels, nuclear power plants, and other structures, and to search for geothermal areas, water resources, archeological ruins, etc.

In seismic exploration, seismic waves or signals are generated by shots from one of several types of energy sources and detected by arrays of sensitive devices or receivers called geophones or hydrophones. The most common measurement made is of the travel times of seismic waves, although attention has been increasingly directed to the amplitude of seismic waves or changes in their frequency content or wave shape.

The measurement of seismic signals may be seriously interfered by external factors such as wind, vehicular and pedestrian traffic, microseisms and at sea, ship noise and environmental noise due to marine life. Moreover, solid friction in the Earth as well as seismic waves scattering attenuate the measured signals. Thus, a plurality of traces from different shots resulting from the interaction of a plurality of cooperating sources and receivers, but having the same subsurface incident point, are gathered and combined together by use of various algorithms well known to those skilled in the geophysical art. Multiple coverage tends to destructively attenuate random noise but enhance coherent reflection data. One such method is referred to as a Common Mid Point ("CMP") stacking which will now be illustrated with reference to FIG. 1.

In FIG. 1, sound waves generated by acoustic sources $S_1$–$S_3$ located on surface respectively are detected by receivers $R_1$–$R_3$, after sound wave reflection from interface 14 along ray paths 20 and 30, 22 and 28, 24 and 26. The number of the energy sources can be different from that of the receivers. The ray paths shown all converge at a common mid point 16. The surface separation between the respective sources and correspondingly numbered receivers is termed the offset. Correction for angularity (also called Normal Moveout or "NMO") to the respective ray paths by stacking them together would collapse them to zero-offset as represented on the surface by $S_0/R_0$ to form two-way travel path 18 impinging on the common mid point 16. In this case of zero dip, mid point 16 also forms a common depth point as well. Because all of the ray paths are incident on the same subsurface point, here CMP 16, the traces can be stacked validly to enhance the signal-to-noise ratio.

Near-surface lateral velocity variations and surface elevation changes create travel-time variations that may be approximated by surface-consistent static time shifts. In FIG. 1 there are shown two subsurface earth layers I and II, separated by line 12, characterized respectively by acoustic propagation velocities of $V_I$=1500 meters per second (m/s) and $V_{II}$=3100 m/s. $P_{si}$ and $P_{rj}$ identify those portions of the near-vertical ray paths that traverse the variable-thickness upper low velocity layer I, after ray bending due to Snell's law of refraction at the interface 12, beneath sources $S_i$ and receivers $R_j$. Because of a longer combined path length of $P_{s3}+P_{r3}$ through the low velocity layer I, the total travel time along ray path 20, 30 from $S_3$ to $R_3$, after application of NMO, will still be longer than the total travel time along either ray path 22, 28 from $S_2$ to $R_2$ or ray path 24, 26 from $S_1$ to $R_1$, corrected for NMO, where the combined ray path $P_{s2}+P_{r2}$ or $P_{s1}+P_{r1}$ through the low velocity layer I is shorter. Note that FIG. 1 gives an example where the velocity in the low velocity Layer I has a constant volume. In reality, this low velocity Layer I, which is usually 4 to 50 meter thick, is characterized by seismic velocities that are not only low (usually between 200 and 2,000 m/s), but at times highly variable. Proper statistical methods need to be used to estimate the low velocity layer. It is known in the art, therefore, that even though the low-velocity segments of the total ray path are relatively short, travel-time differences are not negligible due to the very low velocity at or near the surface I. The respective time delays $s_i$ and $r_j$ due to a variable-thickness low velocity layer, here the surface layer I, are defined as the surface-consistent statics which must be applied as corrections to the reflection travel times prior to stacking for maximizing inter-trace reflection coherency. The statics are termed surface-consistent because they are due to irregularities of the near-surface low velocity layer.

In the example of FIG. 1, only a few of sources and receivers are shown for simplicity. The relative static corrections can be easily obtained for this simple, constant velocity case. In reality, calculating surface-consistent residual statics correction to compensate for time shifts in stacked many thousands of seismic traces, many of indifferent or poor quality, recorded from interfacing between up to thirty cooperating seismic sources and receivers poses a challenge to the art.

The Prior Art

Since the earliest days of seismic exploration, geophysicists have recognized the need to correct for the low velocity in the weathered and unconsolidated sediments near the earth's surface. The data processing procedure has been described by Yilmaz, in a book entitled "Seismic Data Processing," published by Society of Exploration Geophysics, Tulsa, Okla., 1987, Marsden, in Static Corrections—a Review, The Leading Edge, 12, Part 1, pp. 43–49, Part 2, pp. 115–120, and Part 3, pp. 210–216, 1993, and Sheriff and Geldart, in Exploration Seismology, Second Edition, Cambridge University Press, Cambridge, England, 1995. The first corrections for elevation and low velocity are field statics. A reference level is determined that is below the low velocity layer (LVL) and field statics move the sources and receivers to the reference level. CMP gathers are used to generate a set of preliminary velocity picks that are used to calculate NMO corrections. Residual statics corrections are calculated using the corrected data. The process is repeated until the results converge.

The conventional method for calculating residual statics corrections was developed by Taner, et al., in "Estimation and correction of near-surface time anomalies," Geophysics, 39, pp. 441–463, 1974 and Wiggins, et al., in "Residual statics analysis as a general linear inverse problem," Geophysics, 41, pp. 922–938, 1976. The time delays caused by the passage of seismic signals through the LVL should depend on path. After the NMO corrections, it is assumed that all of the paths are vertical and estimate a single time delay that is "surface consistent" (each source and receiver location has a time delay that does not depend on the wave path). The time delay, denoted by $t_{srk}$, for a trace that follows a path from a source (s) to a receiver (r) via a common midpoint (k) is determined by maximizing the cross correlation between the trace and the CMP gather. The total time delay has four components: the source static ($S_s$), the receiver static ($R_r$), the two way travel time from the reference level to a reference subsurface reflector ($\Gamma_k$), and a residual NMO correction $[M_k(X_{sr}^2)]$ where $X_{sr}$ is the distance from the source to the receiver, as shown in equation (1):

$$t_{srk} = S_s + R_r + \Gamma_k + M_k(X_{sr}^2). \qquad (1)$$

Although the total time delay ($t_{srk}$) is an independent value for each trace, the four types of parameters in the total time delay equation each occur in many traces. Thus, the parameters are overdetermined (i.e., there are many more equations than parameters). For example, for a problem with 4776 traces, 100 shots, 216 receivers, and 423 common midpoints, there are 4776 equations and 1162 parameters. Since the equations are overdetermined, they can only be solved by minimizing the errors (by using the method of least squares).

Taner et al. discovered that the problem is both overdetermined and underdetermined. Although there are many more equations than unknowns, he found sets of nonzero parameters that satisfy the total time delay equation when all of the total time delays are zero. These solutions form a null space and we can add an arbitrary linear combination of the vectors in the null space to any solution of the total time delay equation and still have a solution. Taner et al. added an extra set of terms to the least squares objective function to eliminate the null space solutions.

Wiggins et al. clarified the work of Taner et al. by applying singular value decomposition to find the least squares solution of the total time delay equation, by displaying the eigenvectors for a small problem, and by introducing the term "null space."

Residual statics corrections can be calculated in two steps: use crosscorrelation to estimate the total time delay ($t_{srk}$) for each trace and use least squares to find the parameters in the total time delay equation. Ronen et al., in "Surface-consistent residual statics estimation by stack-power maximization," Geophysics, 50, pp. 2759–2767, 1985, proposed a one step alternative approach: stack power maximization. Ronen et al. defined an objective function that measures the correlation between all of the traces in each CMP gather. Changes in the parameters in the total time delay equation cause a time shift for each trace and change the correlation between traces. Ronen et al. searched for parameter values that maximize the stack power.

If synthetic data is created by time shifting a trace, correlation of the two traces will identify the time shift (the correlation will be 1.0 at the proper time shift). For real data, there may be many local maxima in the correlation function. The failure to find the largest local maxima results in a "cycle skip." The stack power function depends on thousands of traces and hundreds of parameters and can have a very large number of local maxima (if there are N parameters and M local maxima in each dimension of the N dimensional space, the logarithm of the total number of local maxima is Nx log M). Most optimization methods will find a local maximum but not a global maximum. A problem with many local maxima requires a global optimization method.

Rothman, in "Nonlinear inversion, statistical mechanics, and residual statics corrections," Geophysics, 50, pp. 2784–2796, 1985, recognized that the residual statics problem was a global optimization problem and proposed to solve the problem using the simulated annealing method. He defined the stack power optimization using two of the four types of parameters in the total time delay equation; his parameters are the static corrections for the sources and receivers. Since the total stack power is a sum of the stack power for each CMP, the CMP term ($\Gamma_k$) shifts all of the traces in the stack and does not change the stack power. He argued that the residual NMO correction $[M_k(X_{sr}^2)]$ was cumbersome to estimate and had a small impact on the stack power. Subsequently, Rothman, in "Automatic estimation of large residual statics corrections," Geophysics, 51, pp. 332–346, 1986, improved his method and applied it to some field data that required large static corrections (up to 200 ms).

DuBose, in "Practical steps toward realizing the potential of Monte Carlo automatic statics," Geophysics, 58, pp. 399–407, 1993, proposed several innovations to improve Rothman's method. The simulated annealing method depends on a parameter: the "temperature." DuBose proposed an algorithm for finding the proper temperature. To apply his method, he measures the changes in the statics from one iteration to the next. If the changes are too small, he raises the temperature. If the changes are too large, he reduces the temperature. Since he performs calculations in the frequency domain, each trace can be stored compactly and time shifting is performed by an efficient multiplication by a complex number. In the time domain, each trace is sampled at a regular period and cross correlation for a time shift that is a fraction of a sampling step requires interpolation. No interpolation is required in the frequency domain.

DuBose assumes that receiver statics are constrained with position along the line such that the change from one receiver to the next is bounded by a value substantially smaller than the largest possible static. He also assumes that any shot that is very close to a receiver station should have its static constrained within another modest limit to be near the static of its receiver station. These assumptions limit the regions in parameter space that need to be searched. He modifies the objective function by performing a running average over a few adjacent stacked traces. To eliminate the null space from the problem, he adds a penalty term to the objective function.

U.S. Pat. No. 5,508,914 issued to Lee disclosed a method for calculating static corrections for seismic data by minimizing an objective function. The surface consistent source and receiver statics that maximize the coherence of reflections are determined by simulating the crystallization process of a system of fictitious classical particles whose interaction is given by the objective function.

Despite many efforts and progresses made in the field, the methods cited above are quite expensive of computing time.

None seems to answer the following two inquiries very well: (1) how to find the correct maximum if there are many local maxima, and (2) how to get to the correct maximum with the fewest calculations. Therefore there is a need to develop a more efficient method to estimate the residual statics for massive numbers of seismic traces.

Recently, an improved algorithm for solving global optimization problems was developed at the Center for Engineering Science Advanced Research (CESAR) at the Oak Ridge National Laboratory (ORNL), as disclosed by Barhen, et al., in "TRUST: A deterministic algorithm for global optimization," Science, 276, pp. 1094–1097, 1997. The algorithm is called TRUST (terminal repeller unconstrained subenergy tunneling). The results reported in Barhen, et al. were fruits of a collaborative project to apply TRUST to the residual statics problem using an objective function defined by DuBose, although the objective function was not identical to the function used in DuBose (1993). While the result was promising, it still took a substantial computing time to find a global local minimum. Indeed, it did not always find the globally optimum values for large residual statics problems with 100 or more parameters. This, combined with expensive computing time associated with the current available methods, has prompted further investigation of improvements in calculating the static corrections for seismic data.

SUMMARY OF THE INVENTION

The present invention overcomes the disadvantages of the prior art and relates to new approaches to the calculation of residual statics corrections. Specifically, the present invention relates to attempting to calculate the residual statics corrections by framing the calculation as a global optimization of a total stack power. The present invention includes at least two new approaches to deal with this many-parameter global optimization problem. First, a procedure and scheme are developed to decouple the many-parameter stack power into a number of components, each is related to only one CMP gather of seismic traces. Second, a Stochastic Pijavakij Tunneling ("SPT") search is performed to eliminate regions in the parameter space where a global minimum is unlikely to exist so that the global minimum may be quickly discovered. These two new approaches can be used independently or together to facilitate the calculation of residential statics corrections.

In this regard, one aspect of the present invention relates to a method for generating surface-consistent residual statics corrections corresponding to common midpoint stacking of gathers of seismic traces recorded from interaction between a plurality of seismic sources and receivers. A total stack power associated with the seismic traces is constructed, wherein the seismic traces are described by a plurality of first parameters. The total stack power is decoupled into a plurality of individual stack powers, wherein the plurality of individual stack powers are functions of a plurality of second parameters that are mapped from the plurality of first parameters. A substantially global maximum for each individual stack power and the plurality of second parameters corresponding to the substantially global maximum for each individual stack power are found. The plurality of first parameters from the plurality of second parameters corresponding to the substantially global maximum for each individual stack power are obtained by mapping. A substantially global maximum for the total stack power is subsequently obtained by using the plurality of first parameters obtained above as inputs. The plurality of first parameters corresponding to the substantially global maximum for the total stack power are then determined and accepted as the static corrections.

Another aspect of the present invention relates to a method for generating surface-consistent residual statics corrections corresponding to common midpoint stacking of gathers of seismic traces recorded from interaction between a plurality of seismic sources and receivers. A stack power associated with the seismic traces is constructed, where the seismic traces are described by a plurality of parameters. The plurality of parameters define a parameter space. In interation preferably performed by a computer, an SPT search is performed to find a substantially global maximum for the stack power and the plurality of parameters corresponding to the substantially global maximum of the stack power. The plurality of parameters corresponding to the substantially global maximum for the stack power are accepted as the static corrections.

A further aspect of the present invention relates to a method for generating surface-consistent residual statics corrections to compensate for surface-consistent static time shifts in stacked seismic traces recorded in common midpoint stacking gathers from interfacing between a plurality of seismic sources and receivers. A total stack power E(x) is constructed, where x is a single statics correction vector in an N-dimensional space, N being the sum of the total number of the seismic sources and the total number of the receivers. The total stack power E(x) is in the form of $$E(x) = \sum_k g_k(x),$$

where $g_k(x)$ is the stack power for CMP k, k being an integer from 1 to K, K being the total number of the CMP gathers. The total stack power is decoupled into K components by mapping $g_k(x)$ into $g_k(^k v)$, $^k v$ being a vector in an $N_k$-dimensional space having components $^k v_i$, i=1, . . . , $N_k$, $N_k$ being an integer greater than zero but smaller than N, wherein each vector $^k v$ corresponds to a different one of the K components of the total stack power, and each component of each vector $^k v$ represents one seismic trace. An objective function $f(^k v)$ is introduced in the form of $$f(^k v) = -g_k(^k v).$$

Iteratively, regions in the Nk-dimensional space, where the global minimum is unlikely to exist, are eliminated until a substantially global minimum of the objective function $f(^k v)$ in the $N_k$-dimensional space is reached. A substantially maximum stack power corresponding to the substantially global minimum of the objective function can be obtained. The static corrections for the sources and receivers corresponding to the substantially maximum stack power are then found and accepted as the surface-consistent residual statics corrections.

Another further aspect of the present invention relates to a method for generating surface-consistent residual statics corrections corresponding to a stacked gather of seismic traces recorded from interaction between a plurality of seismic sources and receivers through common midpoint stacking gathers by maximizing the total stack power of the stacked gathers. The seismic traces are perturbed by near surface geologic irregularities including surface-consistent static time shifts and the total stack power is a summation of individual powers over each seismic trace in frequency domain. The total stack power is decoupled by introducing a plurality of parameters in an N-dimensional space so that the total stack power becomes a function of the plurality of parameters, where N is the total number of the sources and receivers. An objective function proportional to the total stack power is introduced, wherein the objective function has a plurality of minimum in the N-dimensional space, and at least one of the plurality of minimum is a global minimum. In an iteration performed in association with a computer, a plurality of pseudo-Lipschitz constants are used to construct a plurality of Pijavskij cones to exclude the regions on the N-dimensional space where the global minimum is unlikely to exist until the global minimum is substantially reached and the total stack power becomes substantially maximal. The plurality of parameters in the N-dimensional space corresponding to the substantially global minimum are obtained and accepted as final. The final plurality of parameters are applied to the seismic trace gathers as static corrections to convert the raw seismic traces to a display of coherent seismic traces.

In another aspect, the present invention relates to a method for generating surface-consistent residual statics corrections corresponding to common midpoint stacking gathers of seismic traces recorded from interaction between a plurality of cooperating seismic sources and receivers. Practicing the present invention in one embodiment includes the steps of constructing a total stack power associated with the seismic traces, decoupling the total stack power into a plurality of individual stack powers, introducing an objective function proportional for each individual power, iteratively performing an SPT search to find a substantially global minimum for each objective function in a parameter space, where each substantially global minimum for an objective function is corresponding to a plurality of first parameters and a substantially global maximum of a corresponding individual stack power, obtaining a substantially global maximum for the total stack power by summation over the substantially global maximum of the individual powers, where the substantially global maximum for the total stack power is corresponding to a plurality of second parameters, and accepting the plurality of second parameters corresponding to the substantially global maximum for the total stack power as the static corrections.

In this embodiment of the present invention, the step of performing an SPT search further includes the steps of obtaining a pseudo-Lipschitz constant corresponding to a local minimum of an objective function and constructing a Pijavskij cone to exclude regions in the parameter space where a substantially global minimum of the objective function is unlikely to exist from further evaluation. The pseudo-Lipschitz constant is the largest slope of any line drawn from the local minimum that is tangent to the curve that defines the basin of attraction for the local minimum. And the Pijavskij cone is formed by a first line and second line, where the first line and the second line intersect with an axis, the axis being an ensemble of parameters in the parameter space, at a first location and a second location thereby to define a region therebetween, the first line having a slope of the pseudo-Lipschitz constant and the region being one of the regions where the global minimum is unlikely to exist.

Other advantages and uses for the present invention will be more clearly understood by reference to the remainder of this document.

DETAILED DESCRIPTION OF THE INVENTION

Figure 1:
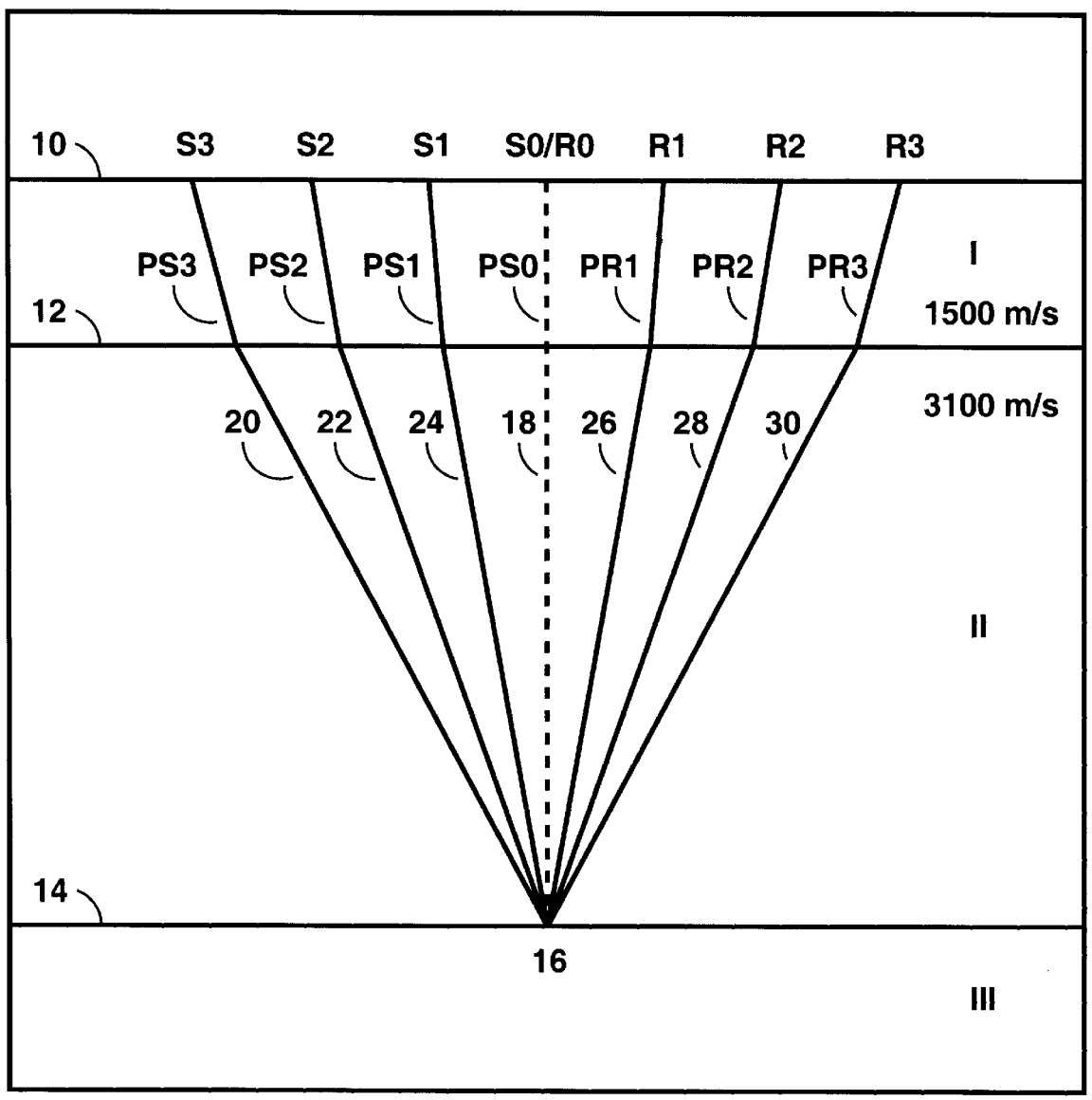
FIG. 1 schematically shows seismic traces referred to a common mid point in the presence of an irregular low velocity layer.

The present invention is more particularly described in the following examples that are intended as illustrative only since numerous modifications and variations therein will be apparent to those skilled in the art. As used in the specification and in the claims, "a" can mean one or more, depending upon the context in which it is used. The preferred embodiment is now described with reference to the FIGS. 2–11, in which like numbers indicate like parts throughout the FIGS. 2–11.

The Overview

Stack power maximization is used in the frequency domain to estimate surface-consistent residual statics. Since the maximization of the stack power is a complex many parameter problem that is difficult to solve, a unique and efficient method is introduced to decouple the many parameter problem into many small problems that can be solved independently. Each small problem can be framed as to find a global maximum for a stack power objective function related to only one CMP gather of seismic traces. This facilitates the evaluation of the static corrections.

However, each decoupled stack power objective function can still have many local maxima. An efficient global optimization method thus is required to find the optimum values for the residual statics.

Generally speaking, as known to people skilled in the art, a global optimization problem cannot be "solved" exactly because the computing resource is limited. Thus, finite resources (function evaluations) must be allocated in an optimal way to find the best estimate of the global optimum. For this reason, it is to be understood that as used in this specification and in claims, a solution of a global optimization problem does not necessarily mean the exact solution of the problem. Since the deterministic version of TRUST does not always find optimum values for large residual statics problems, one dimensional tunneling paths are introduced into TRUST. From a local minimum, a one-dimensional ("1D") version of TRUST is used to explore each of the N dimensions of the problem one dimension at a time. When a point where the objective function has a lower value than the previous local minimum is found, one descends to the next local minimum. Using the 1D tunneling paths allows one to find much better values for the stack power.

According to one embodiment of the present invention, an entirely new approach, namely, Stochastic Pijavskij Tunneling ("SPT") is introduced to speed up the optimization process. The key parameter in SPT is a pseudo-Lipschitz constant that can be used to construct a Pijavskij cone. The slope of the two sides of the Pijavskij cone is determined by the pseudo-Lipschitz constant. The Pijavskij cones exclude regions of the search space from further evaluation. The SPT method has two other parameters (an estimate of the global minimum and the resolution) that can be used to estimate the pseudo-Lipschitz constant. The Pijavskij cones quickly eliminate the search space and, according to several cases in which the present invention have been practiced, the objective function usually is evaluated about ten times to achieve a resolution of 100,000 points in a given parameter range.

In sum, several significant advances are made with respect to the residual statics problem. An upper bound for the stack power is given. And a decoupled stack power is obtained. The solution of the decoupled problem provides a better and closer upper bound for the stack power of the coupled problem. The closer upper bound can be used to produce a good initial estimate of the global minimum of the objective function discussed above.

Many distinct parameter vectors have been found that give high values for the stack power for a realistic sample problem. The sample problem was artificially created by adding large static disruptions to a measured data set. The disrupting statics should be the "true solution" that will maximize the stack power. However, the disrupting statics produced a relatively low value for the stack power! Thus, the "true solution" is unknown for the sample problem. In general, as discussed above, the "true solution" cannot be found for a large global optimization problem. The solutions of the disaggregated problems provide a close upper bound for the stack power. In one example where the present invention is practiced, because the best estimate (2441) produced by one embodiment of the present invention is near the upper bound (2706) and the best of a large family of vectors with high stack power, one may reasonably conclude that a very good estimate for the global maximum, or a substantially global maximum, is found.

The Residual Statics Optimization Theory
Stack Power

Seismic energy is detected by receivers that are located along a line. The source of seismic energy is moved along the line to produce each new shot. Time series data is collected from the receivers for each shot and the source of seismic energy is moved to the next source location for the next shot. The time series data are stored as Fourier coefficients. Common midpoint stacking is used to increase the signal-to-noise ratio. The fold of the data is the number of data sets with the same CMP. Between 1960 and 1980, improvements in data acquisition systems allowed typical values for the fold to increase from one to twelve. Today, thirty is a typical value.

Data are provided by trace ($t=1$, $N_t$, $N_t$ being the total number of the traces). For each trace, the data consist of the Fourier components ($f=1$, $N_f$) of the measured signal. The Fourier components ($D_{ft}$) are complex numbers. The seismic energy travels from a source ($S_t$) to a receiver ($R_f$) via a midpoint (k). For each midpoint (k), the data are stacked:

$$H_{kf} = \sum_t \exp[2\pi i f(S_s + R_r)] D_{ft} \qquad (2)$$

The statics corrections ($S_s$ and $R_r$) are determined to maximize the total stack power (E) in the stacked data:

$$E = \sum_k \sum_f |H_{kf}|^2 \qquad (3)$$

Coherence Factor

A metric, or a "coherence factor," is defined to measure progress toward the maximization of E. The total stack power as given in equation (3) can be disaggregated by defining the power for each CMP ($E_k$):

$$E_k = \sum_f |H_{kf}|^2 \qquad (4)$$

Then the total power E is the sum of all $E_k$'s. Assuming there is an upper bound ($G_k$) for each $E_k$, the coherence factor ($Q_k$) is the ratio of $E_k$ and $G_k$:

$$Q_k = E_k / G_k \qquad (5)$$

Since the $E_k$ are positive, each of the coherence factors will be in the range (0, 1). When all of the traces in a stack are in phase, the coherence factor will be unity.

To define the upper bound ($G_k$), the complex numbers $D_{ft}$ will be written in polar form:

$$D_{ft} = \alpha_{ft} \exp(i\theta_{ft}) \qquad (6)$$

Using the magnitudes of the data ($\alpha_{ft}$), the upper bound is:

$$G_k = \sum_f \sum_t \sum_p \alpha_{ft} \alpha_{fp} = \sum_f \left( \sum_t \alpha_{ft} \right)^2 \qquad (7)$$

Decouple the Components of the Stack Power

A power ($E_k$) and a coherence factor ($Q_k$) are now defined for each CMP. However, each of the statics can influence many of the CMP gathers. Thus, as discussed above, the maximization of the stack power E is a complex many parameter problem that is difficult to solve. To avoid solving this many parameter problem, the stack power is decoupled by introducing new variables. The advantage of this approach is that a large number of small problems, rather than one large problem, can be solved relatively easily and a closer upper bound for the stack power of the coupled problem can be given. The solutions of the decoupled problems provide an excellent initial estimate for the parameters for the coupled many parameter problem.

For each trace (t), a variable $v_t$ is defined by:

$$v_t = S_{st} + R_{rt} \qquad (8)$$

Using matrix notation, the decoupled parameters satisfy:

$$v = A\,x \qquad (9)$$

where x is a parameter vector that combines the vector of source statics corrections (S) and the vector of receiver statics corrections (R):

$$x = [^S{}_R]  \quad (10)$$

Using the new variables, the stacked data definition [equation (2)] becomes:

$$H_{kf} = \sum_t \exp[2\pi i f v_t] D_{ft} \quad (11)$$

Thus, each of the $H_{kf}$ depends on a unique subset of the $V_t$ ($^k v$) and the problem is decoupled. Using the new variable (($^k v$), the components of the stack power are:

$$E_k(^k v) = \sum_f |H_{kf}|^2 \quad (12)$$

Each of the K decoupled global optimization problems can now be solved independently using TRUST or other computational optimization methods to find the components of the vector v ($v_t$). In the following text, $^D G_k$ shall be called as the maximum value for each component of the stack power for the decoupled problem. The $^D G_k$ are a closer upper bound for the components of the stack power than $G_k$.

Singular value decomposition can be used to find the inverse for the matrix equation (9) that defines the disaggregated parameters (v) and map optimal coordinates (v) back to the static corrections (x):

$$x = Bv \quad (13)$$

The map from v to x can be approximately expressed as:

$$x_n = \left( \sum_t \alpha_m v_t \right) / M_n \quad (14)$$

where $M_n$ is the number of nonzero values in column n of A. Thus, $x_n$ can be calculated by averaging over all of the components of v that contain $x_n$.

Figure 2:
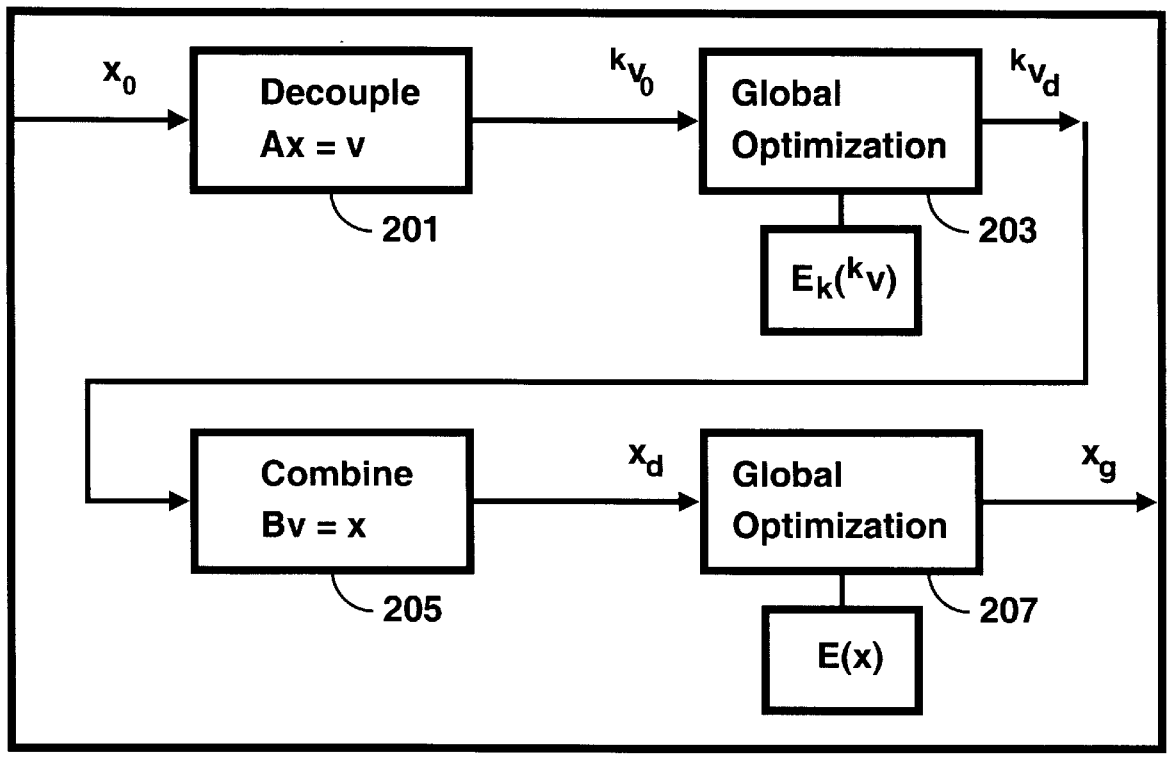
FIG. 2 is a block diagram schematically showing the mapping between the large global optimization problem, i.e., the maximization of the total stack power E(x), and K decoupled global optimization problems.

Referring to FIG. 2, the following is an example of how the mapping between the k decoupled global optimization problems and the large global optimization problem, i.e., the maximization of the total stack power E(x) is performed. For each of the K decoupled global optimization problems, at step 201, an initial value $x_o$ in the x coordinates is mapped to initial values $^k v_o$ for the v coordinates according to Equation (8). At step 203, each of the K decoupled global optimization problems is solved to determine $^D G_k$ the maximum value for each component of the stack power for the decoupled problem, $E_k(^k v)$, and the corresponding v coordinates $^k V_d$. The v coordinates are mapped back to the x coordinates at step 205, according to Equation (13), to determine $x_d$ which is used as an initial guess for the N parameter global optimization problem: E(x). At step 207, the global maximum of E(x) and the corresponding x coordinates $x_g$ are then determined.

Convergence Factor

The convergence factor ($F_k$) is the ratio of the power for each CMP ($E_k$) and the decoupled power bound ($^D G_k$):

$$F_k = E_k / ^D G_k \quad (15)$$

Since the $E_k$ are positive, each of the convergence factors will be in the range (0,1).

Power Norm

Many parameter vectors that give high values for the stack power may be found. It is helpful to know if the vectors are significantly different. Two norms are used to compare vectors: a modified Euclidean norm and a stack power norm. For the modified Euclidean norm, the null space components are removed before the Euclidean norm is calculated. A power norm is defined by comparing the differences in stack power between two vectors. The power norm ($\Delta_{cd}$) is the sum of the absolute differences of the components of the power for the two vectors ($^c x$ and $^d x$):

$$\Delta_{cd} = \sum_k |^c E_k - ^d E_k| \quad (16)$$

The Global Optimization Algorithm

TRUST as a state-of-the-art algorithm for global optimization has been developed in ORNL to solve the following optimization problem: given an objective function f(x), where x is an N dimensional vector that is constrained to lie in a domain (P), find the global minimum ($x_g$). That is, find a point ($x_g$) in P such that $f(x_g) \leq f(x)$ for all x in P. Since the goal in the statics problem is to maximize the total stack power (E), the objective function for TRUST is: f(x)=−E. Thus, finding a global maximum for the total stack power (E) is equivalent to finding a global minimum for the objective function f(x). Alternatively, the objective function for TRUST can be defined as: f(x)=E, which makes an equivalent between finding a global maximum for E and finding a global maximum for f(x). Several papers have been published that describe the deterministic version of TRUST such as Cetin, et al, in "Terminal repeller unconstrained subenergy tunneling (TRUST) for fast global optimization," Journal of Optimization Theory and Applications, 77, pp. 97–126 (1993), Barhen, et al., in "Generalized TRUST algorithms for global optimization," in State of the Art in Global Optimization: Computational Methods and Applications, Floudas, C. A. and Pardolas, P. M., Eds., Kluwer Academic Press, Dortrecht, Netherlands, pp. 163–180 (1996), and Barhen, et al., in "TRUST: A deterministic algorithm for global optimization," Science, 276, pp. 1094–1097 (1997).

In earlier approach to the statics problem, a deterministic version of TRUST was used that found the global minimum by executing a series of cycles of tunneling and descent. As discussed in Barhen (1997), TRUST begins at one corner of the hyperparallelpiped P. From that initial point, TRUST takes a small step into the interior of P in the p direction. If f(x) is lower at the second point than at the first point, TRUST will descend to a local minimum. Otherwise, TRUST will tunnel following a curved path until it reaches a new basin of attraction (where f(x) is lower than the current candidate for global minimum) or x leaves the region P. From each local minimum, TRUST takes a small step in the p direction and begins to tunnel. The TRUST algorithm terminates when x leaves the region P.

Two enhancements to TRUST were described in Barhen (1997): reflection of the path at the boundary of P and one dimensional tunneling paths. A rigorous proof had shown that the deterministic version of TRUST would find the global minimum for the one dimensional case (where x is a scalar). If an N-dimensional problem is approximated by a 1D curve that covers the N-dimensional (ND) region P (or by a regular grid), all global optimization problems can be formally solved.

While the deterministic version of TRUST has been very successful in solving standard non-convex benchmark problems that have up to 20 parameters, it does not always find the globally optimum values for large residual statics problems with 100 or more parameters. The basic reason that TRUST may be less successful with large problems is that the size of the problem increases exponentially with the number of parameters (the number of evaluations is $M^N$, where M is the number of function evaluations in each dimension). Three examples may be used to illustrate this point. The first example was to approximate an N dimensional problem by a regular grid that covers an ND space, it was found that a comprehensive search of the regular grid in the ND space requires $M^N$ function evaluations. For the second example, one may recall that TRUST begins at one corner of the hyperparallelpiped P. For an ND problem, there are $2^N$ corners where TRUST could start. In general, TRUST would explore a different path from each of the corners. The final example is that in a large dimensional space, a curved path has a smaller chance of cutting the basin of attraction of the global minimum. Consider a region (P*) with each dimension equal to one half of the same dimension for P. Then, the ratio of the volumes of P* and P is $1/(2^N)$. As N becomes large, the volume of the region P* becomes a very small fraction of the total volume of P.

Since the deterministic version of TRUST does not always find globally optimum values for large residual statics problems, TRUST was further enhanced by using one dimensional tunneling paths (Barhen, 1997). From a local minimum, the 1D version of TRUST is used to explore each of the N dimensions of the problem one dimension at a time. When a point where the objective function has a lower value than the previous local minimum is found, one descends to the next local minimum. If all of the N directions have been explored and a lower value have not been found, the algorithm is stopped. For the 1D searches, a uniform grid or the nonuniform grid that results from the terminal repeller and the subenergy tunneling transformation may be used. The choice of the dimension to search next local minimum can be numerical order or random.

Using the 1D tunneling paths allowed one to find much better values for the stack power. Still, for the residual statics optimization problem, calculation of the stack power function [f(x)] is expensive (requires many floating point operations) and the calculation of the derivatives of the function with respect to each of the components of the parameter vector (x) is very expensive. During the descent phase of TRUST, derivatives are required to find a local minimum. While finding a local minimum is relatively expensive, the benefit is large. When one performs a search and finds a lower value than the previous local minimum, one knows that the system is in the basin of attraction of a new local minimum that will be lower than the previous local minimum. Thus, one can continually descend toward the global minimum. An algorithm that descends from many random starting points can repeatedly descend into a previously identified local minimum. By searching for a lower value than the previous local minimum, two benefits can be gained. First, there is no need to calculate derivatives while searching. And second, derivatives only need to be calculated when they will lead to a new and lower local minimum.

Stochastic Pijavskij Tunneling (SPT) algorithm is developed as an alternative search method. According to the present invention, a key parameter in the SPT algorithm is a pseudo-Lipschitz constant ($L_{ps}$) that is used to define unpromising regions in the search space that do not need to be explored. For the 1D case (where the parameter vector is a scalar), the Lipschitz constant (L) is an upper bound on the rate of change of the objective function [f(x)]:

$$|df/dx| \leq L \quad (17)$$

Figure 3:
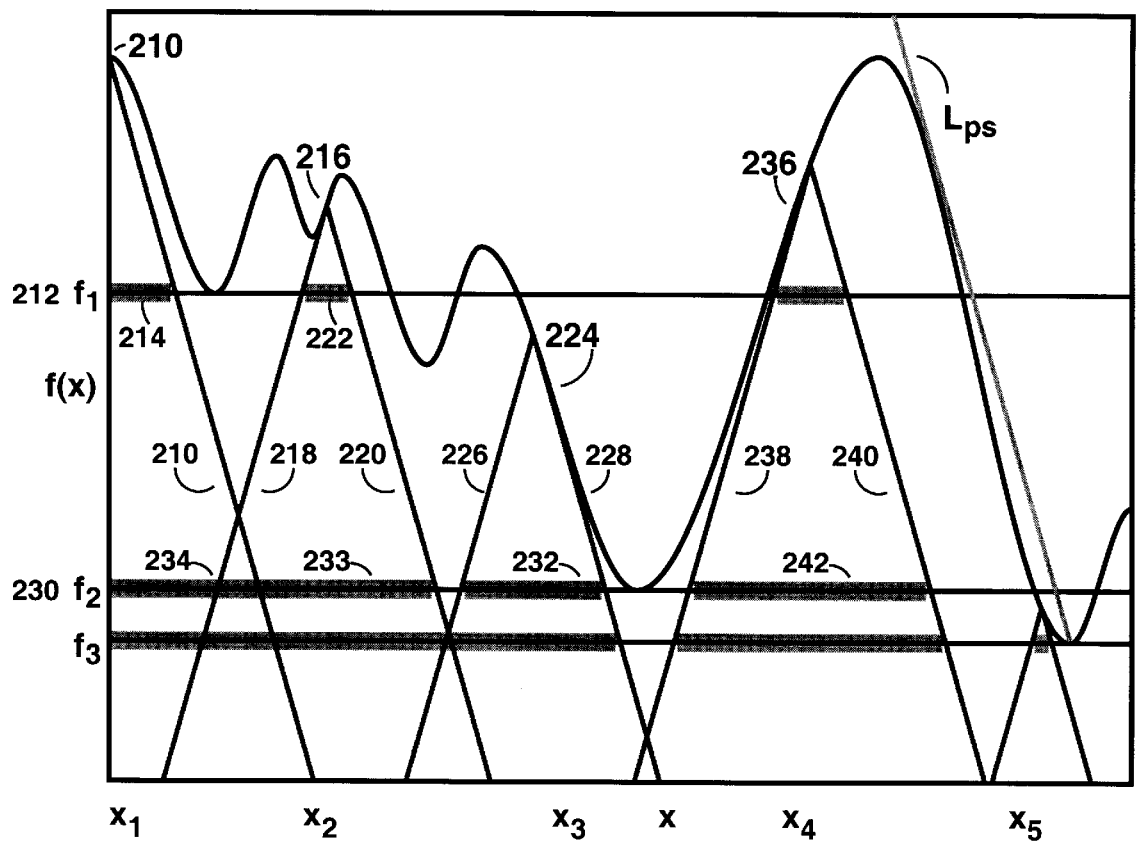
FIG. 3 schematically shows using the SPT algorithm to find the global minimum for a one-dimensional example.

Referring to FIG. 3, the pseudo-Lipschitz constant ($L_{ps}$) is the largest slope of any line drawn from the global minimum that is tangent to the curve that defines the basin of attraction for the global minimum. In general, the pseudo-Lipschitz constant is less than the Lipschitz constant. For a square well (a function that is constant before point a, decreases to a lower value at point a and remains at the lower value to point b at which it returns to the original value), the Lipschitz constant is infinity while the pseudo-Lipschitz constant is finite (assuming that the location of the global minimum is at the midpoint between points a and b).

Still referring to FIG. 3, a simple version of the SPT algorithm for the 1D case is now discussed. The function f(x) is evaluated at $x_1$. From $x_1$, one descends to the local minimum ($f_1$). The local minimum is the best candidate for the global minimum: $f^*=f_1$. From point 1 ($x_1$, $f(x_1)$), line 210 (half of a Pijavskij cone) that has the same slope as the pseudo-Lipschitz line is drawn. The intersection of the line 210 and the line 212 ($f(x)=f_1$) determines a small region 214 of the x axis (the left shaded region on the $f_1$ line in FIG. 1) that cannot have a lower value than the current minimum value ($f_1$). Thus, all the points located in region 214 can be excluded from further evaluation.

A second point in the available portion of the x axis ($x_2$) can now be chosen and the function f(x) is evaluated at $x=x_2$. Since $f(x_2)$ is greater than f*, one does not descend to a local minimum but does tunneling. From point 2 ($x_2$, $f(x_2)$), Pijavskij cone 216 having two lines 218, 220 is constructed, where the magnitudes of the slopes of the two lines 218, 220 are equal to the slope for the pseudo-Lipschitz line. The intersections of the cone 216 and the line 212 determine a small region 222 of the x axis, which is also excluded from the consideration.

A third point in the available portion of the x axis ($X_3$) is then chosen and the function f(x) is evaluated at $x=x_3$. Since $f(x_3)$ is less than f*, $x_3$ is in the basin of attraction of a new local minimum. From ($x_3$, $f(x_3)$), one can descend to the local minimum ($f_2$) and thus obtain new $f^*=f_2$. Again, from ($x_3$, $f(x_3)$), a Pijavskij cone 224 having two lines 226, 228 is constructed. The intersections of the cone 224 and the line 230 determine a region 232 of the x axis. Since the current local minimum $f_2$ is much lower than $f_1$, the three Pijavskij cones 210, 216 and 224 now exclude much more of the x axis, namely, regions 232, 233 and 234.

Again, a fourth point in the available portion of the x axis ($x_4$) is chosen and the function f(x) is evaluated at $x=x_4$. Since $f(x_4)$ is greater than f*, one does not descend to a local minimum but does tunneling. From ($x_4$, $f(x_4)$), a Pijavskij cone 236 having two lines 238, 240 is constructed. The intersections of the cone 236 and the line 230 determine a region 242 of the x axis. The region 242 is excluded from the consideration as well.

Now a fifth point in the available portion of the x axis ($x_5$) is chosen and the function f(x) is evaluated at $x=x_5$. Since $f(x_5)$ is less than f*, $x_5$ is in the basin of attraction of a new local minimum. From ($x_5$, $f(x_5)$), one can descend to the local minimum ($f_3$) and thus obtain new $f^*=f_3$. The function f(x) can be evaluated at a few more points to conclude that $f_3$ is the global minimum for the example in FIG. 1.

In sum, it is found that the Pijavskij cones exclude more of the x axis as the current best local minimum (f*) decreases. Furthermore, the efficiency of the SPT algorithm can be improved by adding a second parameter: an estimate of the global minimum ($f^G$). In the early stages of the algorithm, $f^G$ will increase the region on the x axis that is excluded by the Pijavskij cones. At the later stages of the algorithm, the current candidate for the global minimum (f*)

may become lower than $f_G$ and the parameter will have a small impact. The solutions of the decoupled problems provide a close upper bound for the stack power that can be used to estimate $f^G$. After several attempts at finding the global minimum, the best value found to date can be used as an estimate of $f^G$.

The resolution is the width of the smallest basin of attraction that can be detected. Although the resolution varies from a case to case in reality, for the searches that will be discussed as examples of the present invention in the results section, it is assumed that the range of each component of x was ±50 ms (for a total range of 100 ms). Since up to 100,000 points in the range is allowed in these examples, the corresponding resolution is 1.0 µs. For a comparison, Rothman (1986) had a range of ±160 ms and a resolution of 8 ms, while DuBose (1993) had a range of ±50 ms and a resolution of 2 ms. While the resolution in the embodiments of the present invention is more than three orders of magnitude better than the previous work, there is no physical justification for having a resolution that is greater than a few samples within one cycle of the highest frequency that is in the data set. If the highest frequency is 60 Hz, 2 ms is a reasonable resolution. The present invention allows one to work at a much higher resolution than what can be justified by the experimental details. Assume an objective function that is constant except for randomly distributed square wells of varying depth that are 1.0 µs wide, for this function, the Pijavskij cones would not eliminate any regions of the x axis and one would need to evaluate the objective function 100,000 times to find the global minimum. For the examples that will be discussed below, the Pijavskij cones quickly eliminate almost all of the x axis and one usually evaluates the function about ten times to achieve a resolution of 100,000 points in the parameter range. Thus, the present invention provides an algorithm working at high efficiency without compromising resolution.

Furthermore, according to the present invention, two complementary methods can be utilized to estimate a pseudo-Lipschitz constant $L_{ps}$: measure derivatives and set resolution. As one performs searches and descents as shown in FIG. 1, one calculates the function and the derivatives of the function with respect to each component of x. One can monitor the derivatives and determine the largest values. The pseudo-Lipschitz constant $L_{ps}$ should be larger than any measured value. Still using a 1D search as an example. The pseudo-Lipschitz constant $L_{ps}$ is the ratio of a change in f(x) to a change in x [see equation (17)]. The change in f(x) is the difference between the current value of f(x) and a lower bound on f(x), while the change in x is one half the resolution. Thus, the second parameter, i.e., an estimate of the global minimum ($f^G$), and the resolution can be used to estimate the first parameter (the pseudo-Lipschitz constant $L_{ps}$.) Because the resolution permitted in the present invention is very small, one calculates much higher values for the pseudo-Lipschitz constant $L_{ps}$ than one can obtain by measuring derivatives.

The SPT algorithm as exemplified by the 1D case shown in FIG. 3 can now be developed into a general case where x is an N-dimensional vector as follows:

1. Select a starting point $x_0$. The values of the components of $x_0$ could be chosen as: all zero, a set of numbers corresponding to a solution from a disaggregated problem [from equation (13)], or a set of random numbers;
2. Use a descent algorithm from the starting point $x_0$ to find a local minimum of the objective function f(x);
3. Begin a loop over the N components of x. For each loop, randomly choose an integer (n) in the range 1 to N to select a component $x_n$ that has not been chosen before;
4. Perform a 1D SPT search (as shown in FIG. 3 and discussed above) where all components of x are constant except $x_n$. If the search finds a point in a new basin of attraction, stop the search and descend to the next local minimum; and
5. End of the loop that began in step 3. Stop if the loop has been performed N times. Otherwise return to step 3.

Note that in other embodiments of the present invention, the loop that begins at step 3 can be performed several times. Alternatively, the loop that starts at step 1 can be performed several times.

The invention, including the decoupling scheme and the SPT algorithm, can be better understood by reference to the following examples where the present invention has been practiced to obtain surface-consistent residual statics correction, which are illustrated in FIGS. 4–11.

The Examples

The objective is to estimate surface-consistent residual statics in the following examples. TRUST has been applied to several synthetic data sets. In all cases, TRUST attempted to solve the global optimization problem without using the values of the synthetic disrupting statics.

The first (small) data set contained 24 shots and 50 receivers, for a total of 74 parameters. Although TRUST quickly solved the problems for the small data set, the values of the statics corrections were small and the solutions were found by descent from the initial point (x=0).

The second (medium) data set was designed to be more of a challenge for TRUST with large statics corrections that can not found by a descent from the initial point. The medium data set contained 77 shots and 77 receivers, for a total of 154 parameters. Several major changes in TRUST were required to solve the problems with the medium data set. For the both the small and medium data sets, the coherence factors were large (near 1.0) and the increase in stack power was very large.

The third (large) data set was created by adding disrupting statics to measured seismic data. The large data set has 100 shots and 216 receivers, for a total of 316 parameters. The number of CMPs is 423. The number of traces is 4776 and the number of frequencies is 118. Time required to calculate the stack power and the gradient of the stack power is 100 times longer than for the medium data set. The stack power at the initial point (x=0) was 882. The upper bound on the stack power [G, see equation (7)] is:

$$G = \sum_k G_k = 6589.$$

TRUST has been applied to the 423 decoupled problems. Most of the best values for the coherence factor were much less than 1.0. The total energy for the 423 decoupled problems ($^D G$) is 2706. Using equation (13), the 4776 v coordinates were mapped back to the 316 x coordinates to determine an initial point ($x_d$) for the 316 parameter global optimization problem. The initial value for the energy was 1035. The first local maximum was 2183. After 98 iterations, an interim version of TRUST found the maximum value at 2366.

The SPT version of TRUST according to the present invention has been applied to the third data set to find many points with high values of the stack power. Additionally, both the modified Euclidean distance norm and the power norm are used to measure the differences between a few (22) of the points with stack power greater than 2365.

Figure 4:
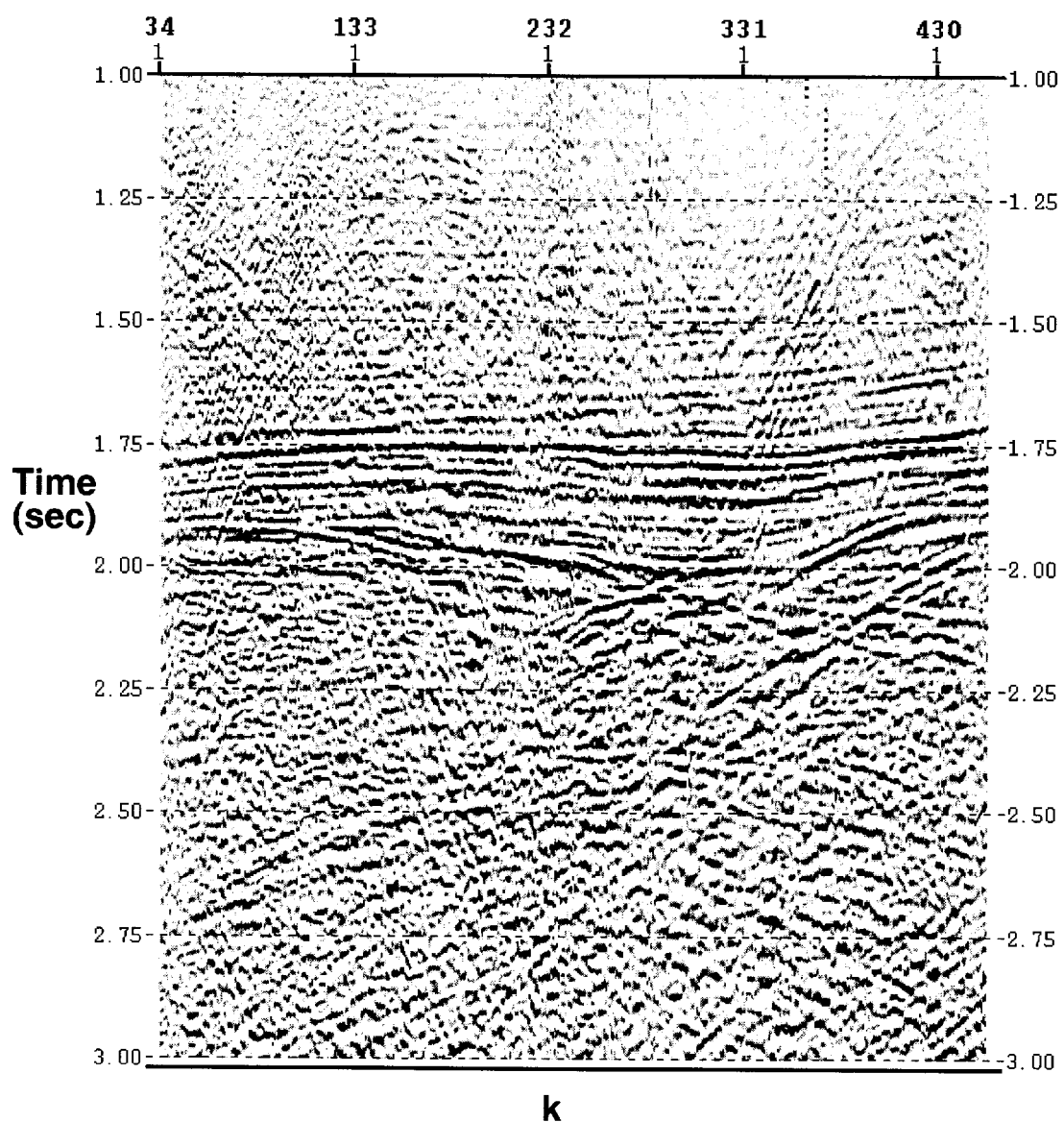
FIG. 4 displays a seismic image before the application of the disrupting statics.
Figure 5:
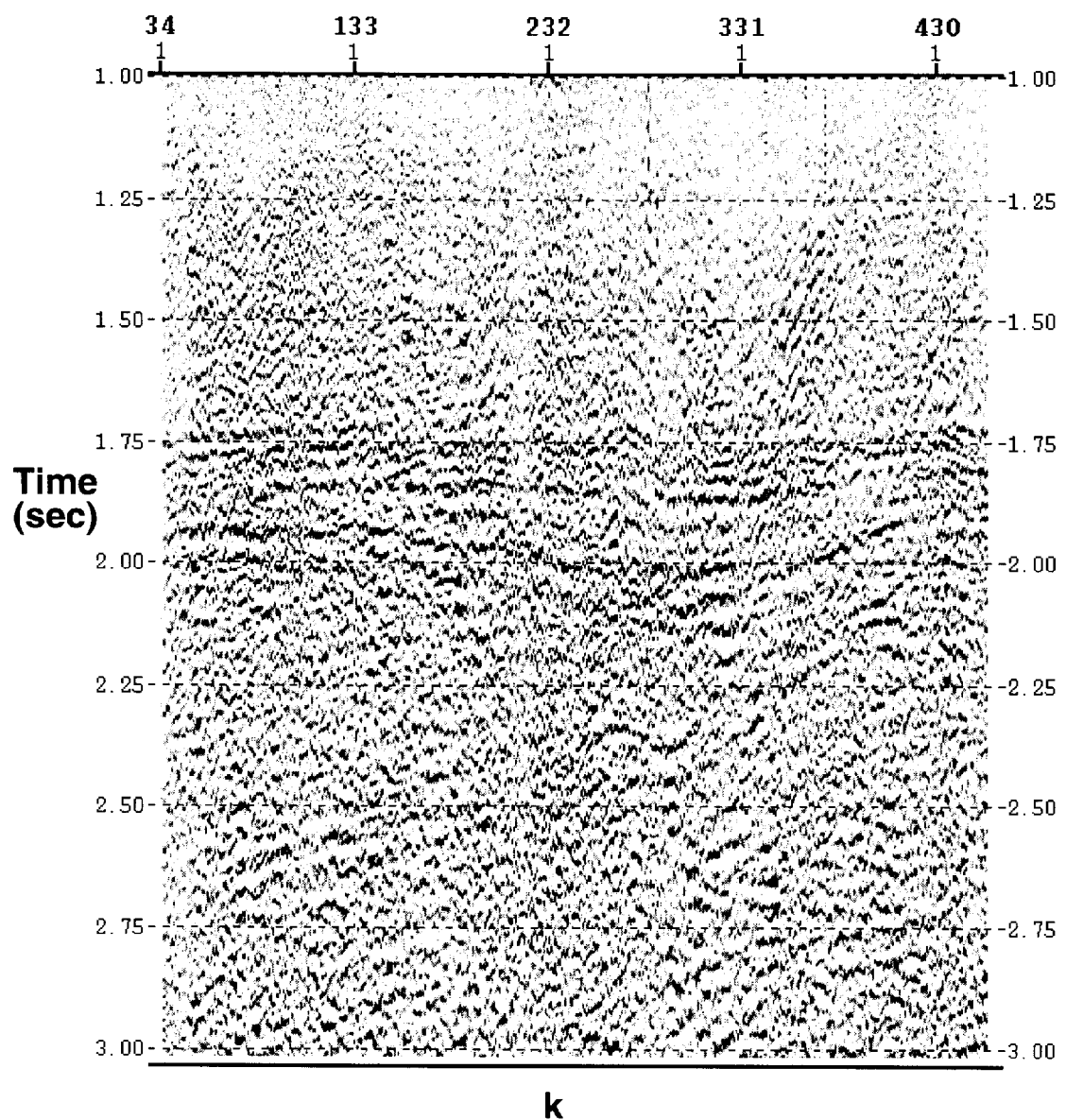
FIG. 5 displays the disrupted seismic image of FIG. 4 but before the application of residual statics corrections.
Figure 6:
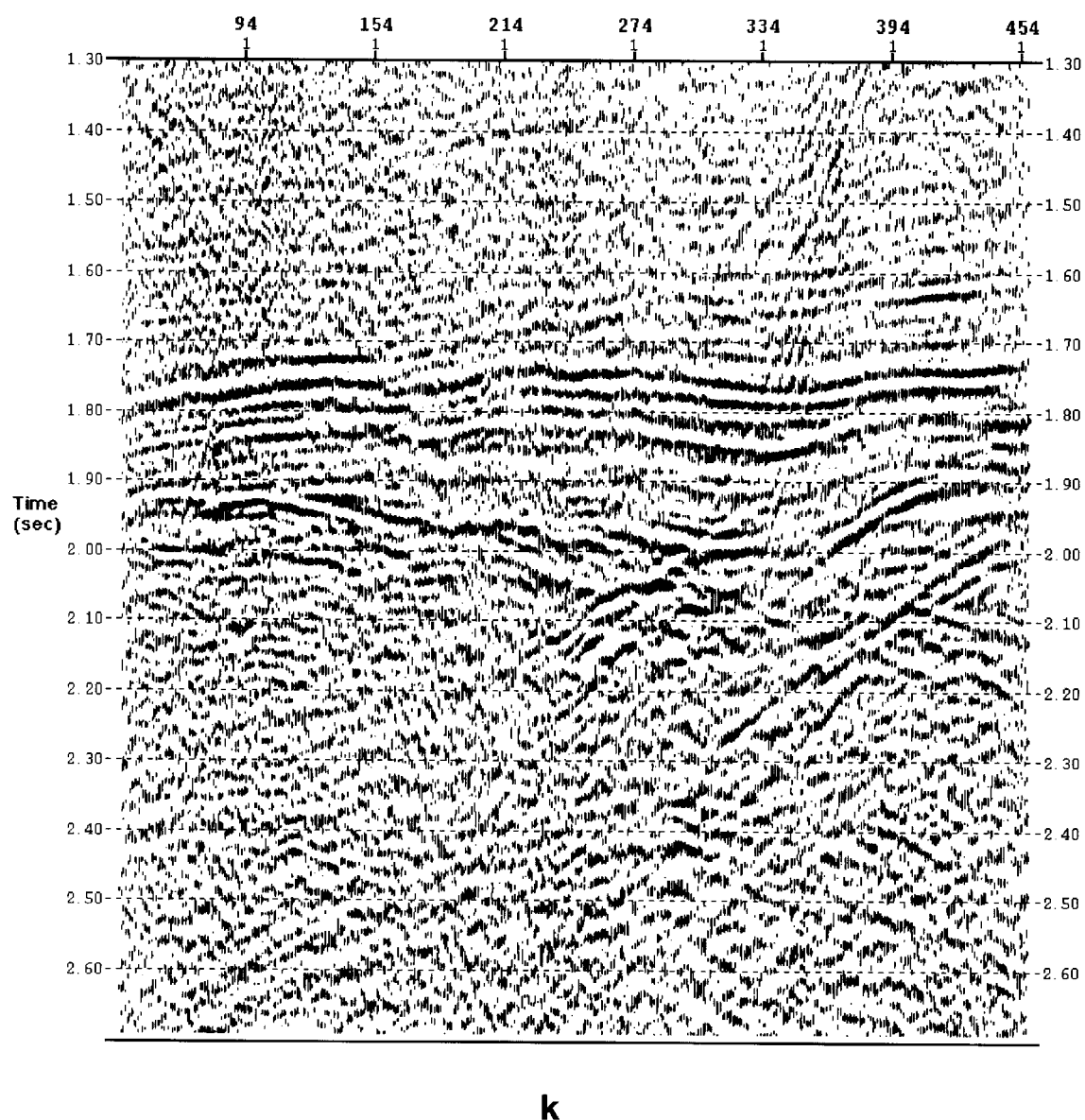
FIG. 6 displays the corrected seismic image of FIG. 5 after the application of residual statics corrections obtained through practicing one embodiment of the present invention.

Referring now to FIGS. 4–6, where three seismic images: before disruption, disrupted, and after correction are shown, respectively. The original seismic image before the application of disrupting statics is displayed in FIG. 4. The disrupted seismic image is plotted in FIG. 5 while the image after the static corrections is shown in FIG. 6. The seismic reflections are well defined in FIGS. 4 and 6 but not defined in FIG. 5.

There are some interesting differences (cycle skips) between FIGS. 4 and 6 that will be discussed below.

The coherence factor ($Q_k$) as the ratio of the stack power ($E_k$) for each CMP and the upper bound on the power ($G_k$) is also evaluated. When all of the traces in a stack are in phase, the coherence factor is 1.0. The best value found for the stack power is 2441. Since the upper bound on the stack power is 6589, the weighted average value for the coherence factors is the ratio of 2441 and 6589=0.370. Thus, most of the traces are not in phase.

Figure 7:
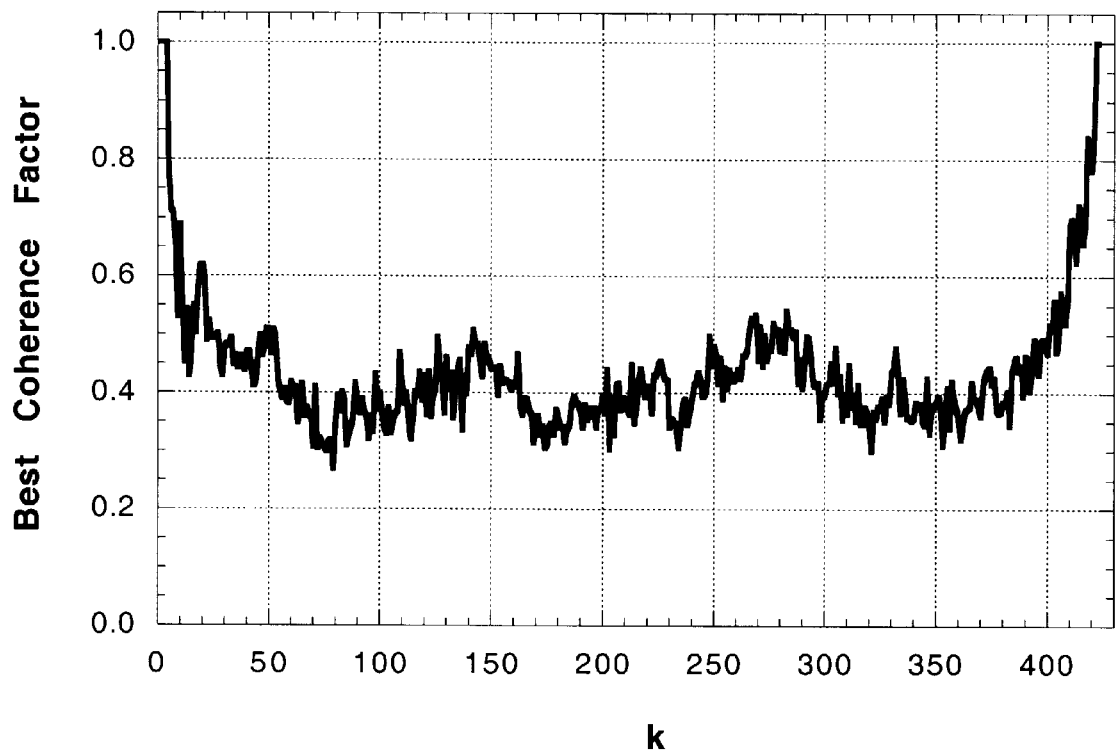
FIG. 7 displays the best coherence factor according to one embodiment of the present invention.

New variables (v) are introduced to decouple the CMP gathers. Each of the decoupled global optimization problems can then be solved independently to find the stack power for the decoupled problem: $^DG_k$. Using the $^DG_k$, a best (close upper bound for the) coherence factor can be obtained. As shown in FIG. 7, most of the values for the best coherence factor range from 30% to 50%.

Figure 8:
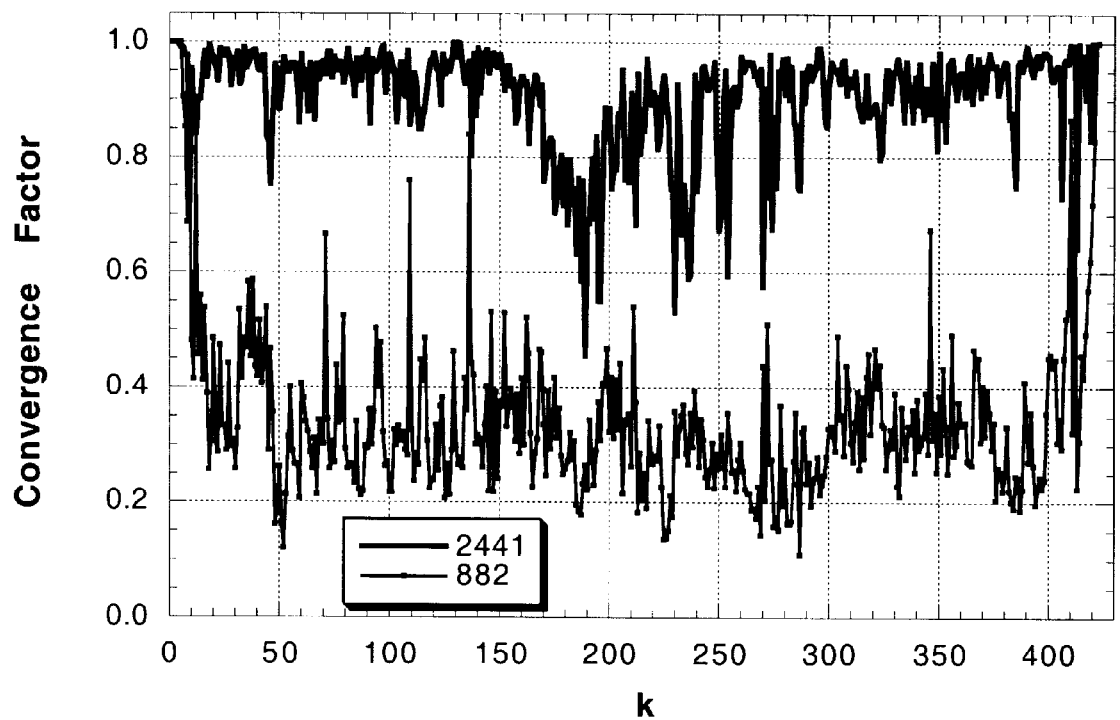
FIG. 8 displays convergence factor for two cases, case 882 and case 2441, used to illustrate the present invention, where 882 is the initial value of the stack power when all of the corrections are zero, and 2441 is the best value found for the stack power by practicing one embodiment of the present invention.
Figure 9:
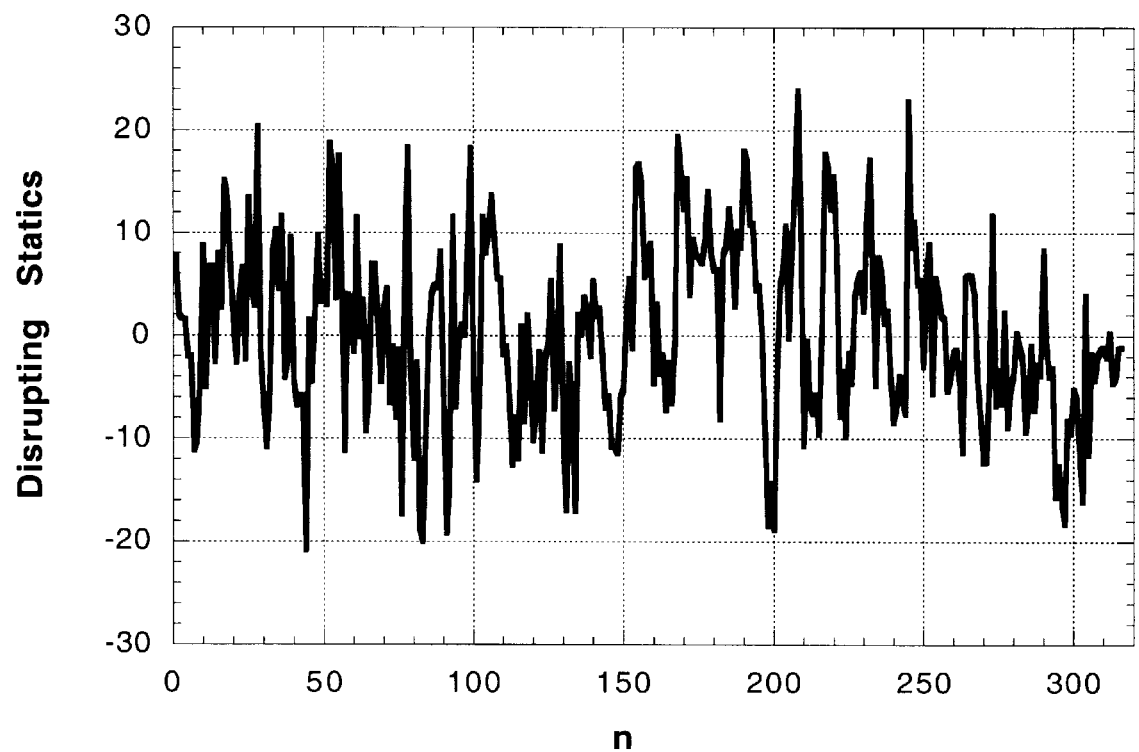
FIG. 9 displays the disrupting statics that were applied to the original seismic image in FIG. 4 to produce the input image in FIG. 5.
Figure 10:
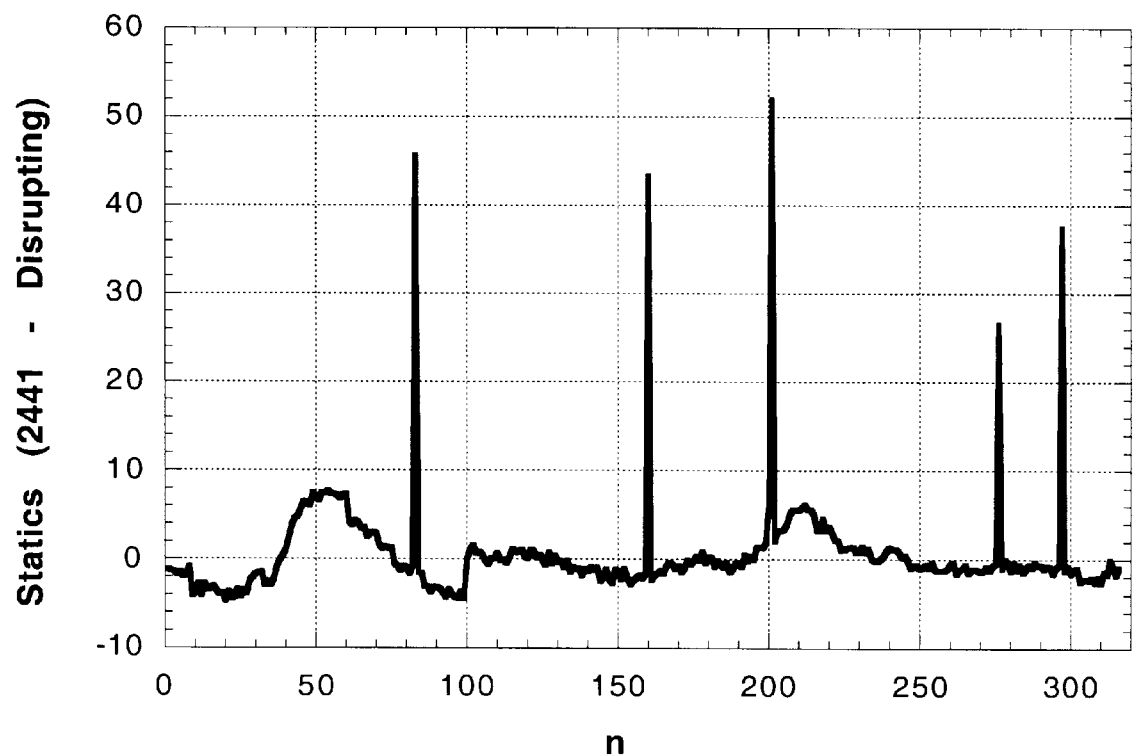
FIG. 10 displays the difference between the statics for the 2441 case calculated according to one embodiment of the present invention and the disrupting statics of FIG. 9.

The convergence factor compares current values for the stack power to the disaggregated upper bound on the stack power. In FIG. 8, the convergence factor is plotted for two values of the stack power: 882 and 2441. Most of the values for the convergence factor are above 80% when the power is large, i.e., when the stack power=2441.

There are many points with high values of the stack power found by using the SPT version of TRUST. The issue is whether these points are distinct. Both the modified Euclidean distance norm and the power norm are used to measure the differences between a few (22) of the points with stack power greater than 2365.

Using the distance norm, the differences ranged from 2.0 to 137.0. Only a few of the values are smaller than 20.0. In general, the null space correction is not very large. If the null space correction is defined to be the difference in Euclidean norm for the distance between two vectors with and without the null space correction, all of the corrections are less than 12.0 (most are less than 8.0) and a few are 0.0. All of the small distances (less than 20.0) occur for the lower values of the power (less than 2405). For the two best values of the power (2427 and 2441), the lowest value of the distance is 72.8. Thus, the two points with best values are not close to any of the other points (and are not close to each other).

The power norm differences range from 9.0 to 95.0. If the power norm versus the stack power is plotted, each of the 22 cases has a substantial range in the power norm. To understand the reason for the large range, another metric, the power difference, is introduced. The power difference is defined as the absolute value of the difference between the stack power for the two cases. It can be shown that the power difference is a lower bound for the power norm. When the power norm is equal to the power difference, every component of the stack power for one of the cases is greater than the corresponding component for the other case. The power difference between the highest power (2441) and the lowest power (2365) is 76. Thus, for the cases with either the smallest power or the largest power, the maximum value of the power norm will be greater then 76. The largest value of the power norm is greater than 76 for all 22 cases.

When delta (defined as the difference between the power norm and the power difference) versus the stack power is displayed, delta decreases as the power increases. The small values of delta for the two highest cases suggest that almost every component of the stack power for the two highest cases is greater than the corresponding component for all of the other cases.

The estimates of the statics generated by practicing the present invention, as shown in FIG. 6, can be compared with the disrupting statics that had been applied to the original seismic data (FIG. 4) to produce the input data for this project (FIG. 5). The disrupting statics are plotted in FIG. 9 and range from −21.0 to 24.0. To compare the results calculated according to the invention with respect to the disrupting statics, the disrupting statics is subtracted from the results. The differences are displayed in FIG. 10 for Case 2441. The most striking result is that five components of the x vector have large differences (cycle skips) for the two cases and the cycle skips occur for the same components (83, 160, 201, 276, and 297). However, when the difference between Case 2441 and Case 2427 is plotted, no cycle skips are shown.

Figure 11:
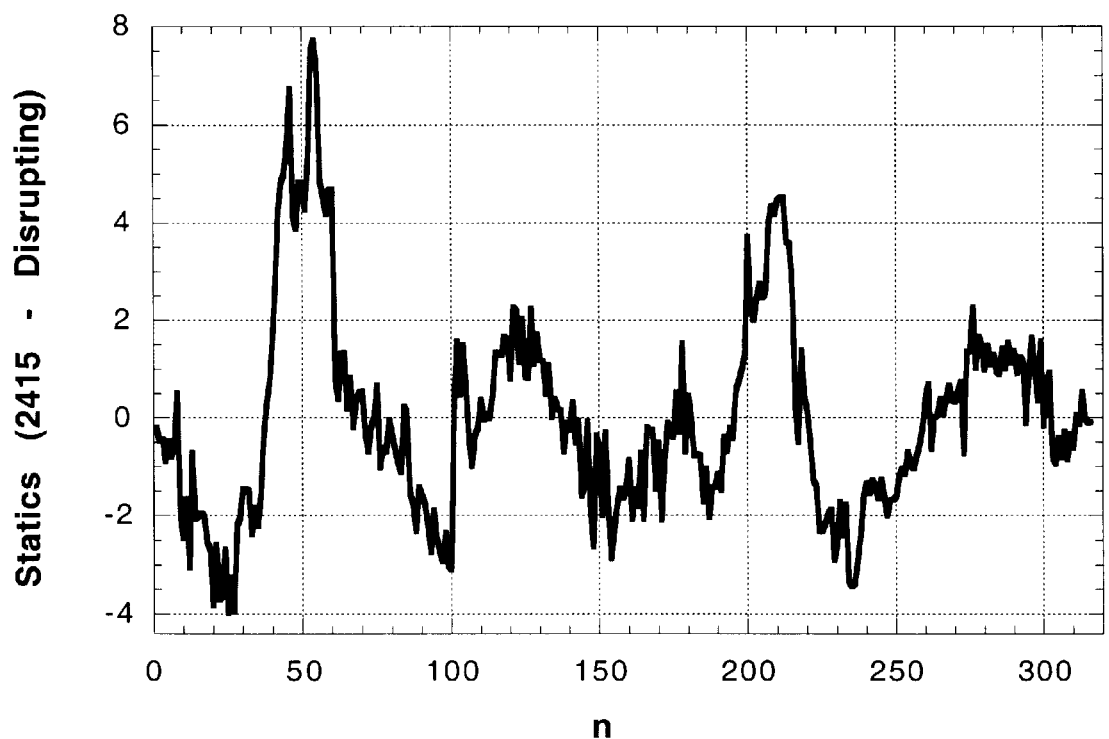
FIG. 11 displays the difference between the statics for the 2415 case calculated according to one embodiment of the present invention and the disrupting statics of FIG. 9.

Still referring to FIG. 6, where the solutions obtained by practicing the present invention are shown, the lines that have strong reflections are not as continuous as the lines in FIG. 4. Although FIG. 4 looks better than FIG. 6, it has a lower stock power (the power from FIG. 4 is 2349 that is lower than all of the 22 cases). However, when one starts from the disrupting statics and climbs to the top of the first peak, one can reach a power of 2415 (better than all but three of our 22 cases). The differences between the statics for the 2415 case and the disrupting statics are plotted in FIG. 11, which does not display any cycle skips at all. The differences displayed in FIG. 11 are significant and range from −4.0 to 8.0. Therefore, the differences between the statics for the 2415 case and the disrupting statics are not due to step size or round off.

These differences between the best solution given by the present invention and the "true solution" (the disrupting statics) invite one to investigate the source of the error. However, since the "true solution" does not maximize the stack power, the true solution for the stack power maximization problem for this data set really is not known as discussed above. Indeed, the best solution given by the present invention gives a substantially maximum stack power and a closer upper bound but not the exact maximum stack power. Thus, it is possible that even the stack with the highest power possible for this data set may represent an unsatisfying solution showing patterns that look much like the "cycle skips" shown in low power local solutions. Therefore, the cycle skips may not be eliminated by maximizing the stack power.

Although the present invention has been described with reference to specific details of certain embodiments thereof, it is not intended that such details should be regarded as limitations upon the scope of the invention except as and to the extent that they are included in the accompanying claims.

What is claimed is:

1. A method for generating surface-consistent residual statics corrections to compensate for surface-consistent static time shifts in stacked seismic traces recorded in common midpoint stacking ("CMP") of gathers from interfacing between a plurality of seismic sources and receivers, comprising:

a. constructing a total stack power E(x), wherein x is a single statics correction vector in an N-dimensional space, N being the sum of the total number of the seismic sources and the total number of the receivers, and the total stack power E(x) is in the form of $$E(x) = \sum_k g_k(x),$$

$g_k(x)$ being the power for CMP k, k being an integer from 1 to K, K being the total number of the CMP gathers;

b. decoupling the total stack power into K components by mapping $g_k(X)$ into $g_k(^k v)$, $^k v$ being a vector in an $N_k$-dimensional space having components $^k v_i$, i=1, ..., $N_k$, $N_k$ being an integer greater than zero but smaller than N, wherein each vector $^k v$ corresponds to a different one of K components of the total stack power, and each component of each vector $^k v$ represents one seismic trace;

c. introducing an objective function $f(^k v)$ having the form of $$f(^k v) = -g_k(^k v);$$

d. iteratively eliminating regions in the $N_k$-dimensional space where the global minimum is unlikely to exist until a substantially global minimum of the objective function $f(^k v)$ in the $N_k$-dimensional space is reached;

e. obtaining a substantially maximum stack power corresponding to the substantially global minimum of the objective function; and f. accepting the static corrections for the sources and receivers corresponding to the substantially maximum stack power as the surface-consistent residual statics corrections.

2. The method of claim 1, wherein the eliminating step comprises the steps of:

a. selecting a starting point $^k v_0$, wherein the values of the components of $^k v_0$ being all zero, a set of numbers corresponding to a solution from a disaggregated equation, or a set of random numbers;

b. using a descent algorithm from the starting point $^k v_0$ to find a local minimum of the objective function $f(^k v)$;

c. randomly choosing an integer (n) in the range 1 to $N_k$ to select a component $^k v_n$ of the vector $^k v$, $^k v_n$ defining an one-dimensional axis and not being chosen before;

d. calculating the objective function $f(^k v)$ for a selected value of $^k v_n$;

e. performing a one-dimensional Stochastic Pijavskij Tunneling search along the $^k v_n$-axis, where all components of $^k v$ are constant except $^k v_n$, to eliminate regions in the $^k v_n$-axis where a lower local minimum is unlikely to exist;

f. descending to the next local minimum if the search finds a point in a new basin of attraction; and g. returning to step (c) until the loop has been performed $N_k$ times.

3. The method of claim 2, wherein the performing step further comprises the steps of:

h. obtaining a pseudo-Lipschitz constant corresponding to a local minimum;

i. constructing a Pijavskij cone that intersects with the $^k v_n$-axis at a first point and a second point thereby defining a region therebetween; and j. excluding the region from the steps (d)–(f).

4. The method of claim 3, wherein the pseudo-Lipschitz constant is the largest slope of any line drawn from the local minimum that is tangent to the curve that defines the basin of attraction for the local minimum.

5. The method of claim 4, wherein the Pijavskij cone is formed by a first line and second line, the first line and the second line intersecting at ($^k v_n$, $f(^k v_n)$), being symmetrical about $^k v_n$, and the first line having a slope of the pseudo-Lipschitz constant.

6. The method of claim 1, further comprising the step of generating an upper bond for the stack power.

7. The method of claim 6, further comprising the step of finding an estimation of the substantially global minimum from the upper bond for the stack power.

8. The method of claim 7, further comprising the step of increasing the size of the regions that are eliminated by applying the estimation of the substantially global minimum.

9. A method for generating surface-consistent residual statics corrections corresponding to a stacked gather of seismic traces recorded from interaction between a plurality of seismic sources and receivers through common midpoint stacking ("CMP") of gathers by maximizing the total stack power of the stacked gathers, wherein the seismic traces are perturbed by near surface geologic irregularities including surface-consistent static time shifts and the total stack power is a summation of individual powers over each seismic trace in frequency domain, comprising:

a. decoupling the total stack power by introducing a plurality of parameters in an N-dimensional space so that the total stack power becomes a function of the plurality of parameters, N being the total number of the sources and receivers;

b. introducing an objective function proportional to the total stack power, wherein the objective function has a plurality of minimum in the N-dimensional space, at least one of the plurality of minimum is a global minimum;

c. iteratively using a plurality of pseudo-Lipschitz constants to construct a plurality of Pijavskij cones to exclude the regions on the N-dimensional space where the global minimum is unlikely to exist until the global minimum is substantially reached and the total stack power becomes substantially maximal;

d. accepting as final, the plurality of parameters in the N-dimensional space corresponding to the substantially global minimum; and e. applying the final plurality of parameters to the seismic trace gathers as static corrections to convert the raw seismic traces to a display of coherent seismic traces.

10. The method of claim 9, wherein the total stack power has the form:

$$E = \sum_k \sum_f |H_{kf}|^2$$

Where E is the total stack power, k is the CMP number, f is the frequency indexing the Fourier components of the recorded seismic traces, $H_{kf}$ represents the seismic energy for the CMP k and frequency f, $\Sigma\Sigma$ represents that the total stack power E is formed by the sum of all traces in CMP gathers and all the Fourier components in frequency domain.

11. The method of claim 9, wherein each pseudo-Lipschitz constant is corresponding to a local minimum of the objective function in a one-dimensional space, the one dimensional space being a sub-space of the N-dimensional space and having a variable axis.

12. The method of claim 11, wherein the pseudo-Lipschitz constant is the largest slope of any line drawn from the local minimum that is tangent to the curve that defines the basin of attraction for the local minimum.

13. The method of claim 12, wherein the Pijavskij cone is formed by a first line and second line, the first line and the second line intersecting with the variable axis at a first location and a second location thereby to define a region therebetween, the first line having a slope of the pseudo-Lipschitz constant and the region being one of the regions where the global minimum is unlikely to exist.

14. The method of claim 9, further comprising the step of generating an upper bond for the total stack power.

15. The method of claim 14, further comprising the step of finding an estimation of the global minimum from the upper bond for the stack power.

16. The method of claim 15, further comprising the step of increasing the size of the regions where the global minimum is unlikely to exist by applying the estimation of the substantially global minimum.

17. A method for generating surface-consistent residual statics corrections corresponding to common midpoint stacking ("CMP") of gathers of seismic traces recorded from interaction between a plurality of cooperating seismic sources and receivers, comprising:
   a. constructing a total stack power associated with the seismic traces;
   b. decoupling the total stack power into a plurality of individual stack powers;
   c. introducing an objective function proportional for each individual power;
   d. iteratively performing an SPT search to find a substantially global minimum for each objective function in a parameter space, each substantially global minimum for an objective function corresponding to a plurality of first parameters and a substantially global maximum of a corresponding individual stack power;
   e. obtaining a substantially global maximum for the total stack power by summation over the substantially global maximum of the individual powers, the substantially global maximum for the total stack power corresponding to a plurality of second parameters; and
   f. accepting the plurality of second parameters corresponding to the substantially global maximum for the total stack power as the static corrections.

18. The method of claim 17, wherein the step of performing an SPT search further comprises the steps of:
   a. obtaining a pseudo-Lipschitz constant corresponding to a local minimum of an objective function; and
   b. constructing a Pijavskij cone to exclude regions in the parameter space where a substantially global minimum of the objective function is unlikely to exist from further evaluation.

19. The method of claim 18, wherein the pseudo-Lipschitz constant is the largest slope of any line drawn from the local minimum that is tangent to the curve that defines the basin of attraction for the local minimum.

20. The method of claim 18, wherein the Pijavskij cone is formed by a first line and second line, the first line and the second line intersecting with an axis, the axis being an ensemble of parameters in the parameter space, at a first location and a second location thereby to define a region therebetween, the first line having a slope of the pseudo-Lipschitz constant and the region being one of the regions where the global minimum is unlikely to exist.

21. A method for generating surface-consistent residual statics corrections corresponding to common midpoint stacking ("CMP") of gathers of seismic traces recorded from interaction between a plurality of seismic sources and receivers, comprising:
   a. constructing a total stack power associated with the seismic traces, wherein the seismic traces are described by a plurality of first parameters;
   b. decoupling the total stack power into a plurality of individual stack powers, wherein the plurality of individual stack powers are functions of a plurality of second parameters that are mapped from the plurality of first parameters;
   c. finding a substantially global maximum for each individual stack power and the plurality of second parameters corresponding to the substantially global maximum for each individual stack power;
   d. obtaining the plurality of first parameters from the plurality of second parameters corresponding to the substantially global maximum for each individual stack power;
   e. obtaining a substantially global maximum for the total stack power by using the plurality of first parameters obtained in (d) as inputs and the plurality of first parameters corresponding to the substantially global maximum for the total stack power; and
   f. accepting the plurality of first parameters corresponding to the substantially global maximum for the total stack power as the static corrections.

22. The method of claim 21, wherein the first parameters comprise a parameter vector x which is given by $$x=[{}^S_R]$$

where S is the vector of source statics corrections and R is the vector of receiver statics corrections.

23. The method of claim 22, the step of decoupling further comprising the step of mapping the second parameters, the second parameters comprising a parameter vector v, from the first parameters from the following relationship:

$$v=Ax$$

where A is a transforming matrix.

24. The method of claim 23, wherein an individual stack power has the form $$E_k({}^k v) = \sum_f |H_{kf}|^2$$

where k ranges from 1 to K, K being the total number of the CMP gathers, and $$H_{kf} = \sum_t \exp[2\pi i f v_t] D_{ft}$$

representing the stacked data for CMP k, where $D_{ft}$ is a Fourier component, t is an integer ranging from 1 to $N_t$, and $N_t$ is the total number for the seismic traces.

25. A method for generating surface-consistent residual statics corrections corresponding to common midpoint stacking ("CMP") of gathers of seismic traces recorded from interaction between a plurality of seismic sources and receivers, comprising:
   a. constructing a stack power associated with the seismic traces, wherein the seismic traces are described by a plurality of parameters, the plurality of parameters defining a parameter space;

b. iteratively performing an SPT search to find a substantially global maximum for the stack power and the plurality of parameters corresponding to the substantially global maximum of the stack power; and c. accepting the plurality of parameters corresponding to the substantially global maximum for the stack power as the static corrections.

26. The method of claim 25, wherein the step of performing an SPT search further comprises the step of constructing an objective function proportional to the stack power so that the global minimum of the objective function corresponds to the global maximum of the stack power.

27. The method of claim 26, wherein the step of performing an SPT search further comprises the step of:

a. obtaining a pseudo-Lipschitz constant corresponding to a local minimum of an objective function; and b. constructing a Pijavskij cone to exclude from further evaluation regions in the parameter space where a substantially global minimum of the objective function is unlikely to exist.

28. The method of claim 27, wherein the pseudo-Lipschitz constant is the largest slope of any line drawn from the local minimum that is tangent to the curve that defines the basin of attraction for the local minimum.

29. The method of claim 27, wherein the Pijavskij cone is formed by a first line and second line, the first line and the second line intersecting with an axis, the axis being an ensemble of parameters in the parameter space, at a first location and a second location thereby to define a region therebetween, the first line having a slope of the pseudo-Lipschitz constant and the region being one of the regions where the substantially global minimum is unlikely to exist.

* * * * *